US008645355B2

(12) United States Patent
Sandberg et al.

(10) Patent No.: US 8,645,355 B2
(45) Date of Patent: Feb. 4, 2014

(54) MAPPING UNIFORM RESOURCE LOCATORS OF DIFFERENT INDEXES

(75) Inventors: Oskar Sandberg, Zurich (CH); Olivier Bousquet, Ebmatingen (CH)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 13/278,425

(22) Filed: Oct. 21, 2011

(65) Prior Publication Data
US 2013/0103666 A1  Apr. 25, 2013

(51) Int. Cl.
*G06F 17/30* (2006.01)
(52) U.S. Cl.
USPC ............................................. 707/709
(58) Field of Classification Search
USPC ............................................. 707/709
See application file for complete search history.

(56) References Cited

U.S. PATENT DOCUMENTS

2009/0265342 A1* 10/2009 Shuster ............................ 707/5
2012/0016897 A1* 1/2012 Tulumbas et al. ............ 707/759

* cited by examiner

*Primary Examiner* — Rehana Perveen
*Assistant Examiner* — Alexander Khong
(74) *Attorney, Agent, or Firm* — Harrity & Harrity, LLP

(57) ABSTRACT

A server may identify a first address stored in a first search index; determine one or more first identifiers associated with the first address; identify a second address stored in a second search index; determine one or more second identifiers associated with the second address; map the first address to the second address based on a first identifier, of the one or more first identifiers, and a second identifier, of the one or more second identifiers; and transmit the mapping, of the first address to the second address, to a first server associated with the first search index or to a second server associated with the second search index.

20 Claims, 11 Drawing Sheets

410 — http://www.example.com/product/1234

420 — http://products.example.com/get.php?source=Exampledb&UserId=44&sku=1234&ref=1

Example Products Company Telephone Model 10
www.example.com/products/1234
Example.com Example Company new telephones. Phone System with 2 Handsets: Electronics.

FIG. 6A

Example Products Company Telephone Model 10
www.example.com/products/1234
Example.com Example Company new telephones. Phone System with 2 Handsets: Electronics.

MAPPING UNIFORM RESOURCE LOCATORS OF DIFFERENT INDEXES

BACKGROUND

Search engine providers store different indexes of Uniform Resource Locators (URLs). A first index, of a search engine provider, may store a URL for a particular web page. A second index, of the search engine provider, may store a different URL for the same particular web page. The first index may be created due to the activity of a web crawler, while the second index may be created due to submissions of URLs by operators of websites, which include the web page. Some users may access the particular web page via a first search engine that uses the first index. Other users may access the particular web page via a second search engine that uses the second index. As a result, the search engine provider is unable to determine when users are accessing the same particular web page because different users are using different URLs to access the particular web page.

SUMMARY

According to one aspect, a method may include: identifying a first address stored in a first search index; determining one or more first identifiers associated with the first address; identifying a second address stored in a second search index; determining one or more second identifiers associated with the second address; mapping the first address to the second address based on a first identifier, of the one or more first identifiers, and a second identifier, of the one or more second identifiers; and transmitting the mapping, of the first address to the second address, to a first server associated with the first search index or to a second server associated with the second search index. The first address may be associated with a particular document. The second address may be associated with the particular document. The second search index may be not equal to the first search index. The first identifier may be equal to the second identifier.

According to another aspect, a computer-readable medium, that includes instructions executable by at least one processor, may include one or more instructions to: determine a domain and an identifier included in a first address stored in a first search index; determine a key associated with the identifier; produce, based on the domain and the key, a mapping of the first address to a second address that is associated with the domain and the key; and transmit the mapping of the first address to the second address to at least one of a first server associated with the first search index or to a second server associated with a second search index. The second address may be stored in the second search index that is different from the first search index.

According to yet another aspect, a server device may include a first memory, a second memory, and a processor. The first memory may store a first index. The second memory may store a second index. The processor may determine a first identifier for a first address stored in the first index; determine a second identifier for a second address stored in the second index; map the first address to the second address when the first identifier matches the second identifier; retrieve first data of an entry, of the first index, associated with the first address; and transmit, to a second server associated with the second index, the mapping, of the first address to the second address, and the first data.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 4A-4E illustrate an example of matching a first address to a second address;

FIGS. 6A and 6B illustrate example results before and after mapping of addresses of different indexes.

DETAILED DESCRIPTION

Figure 1:
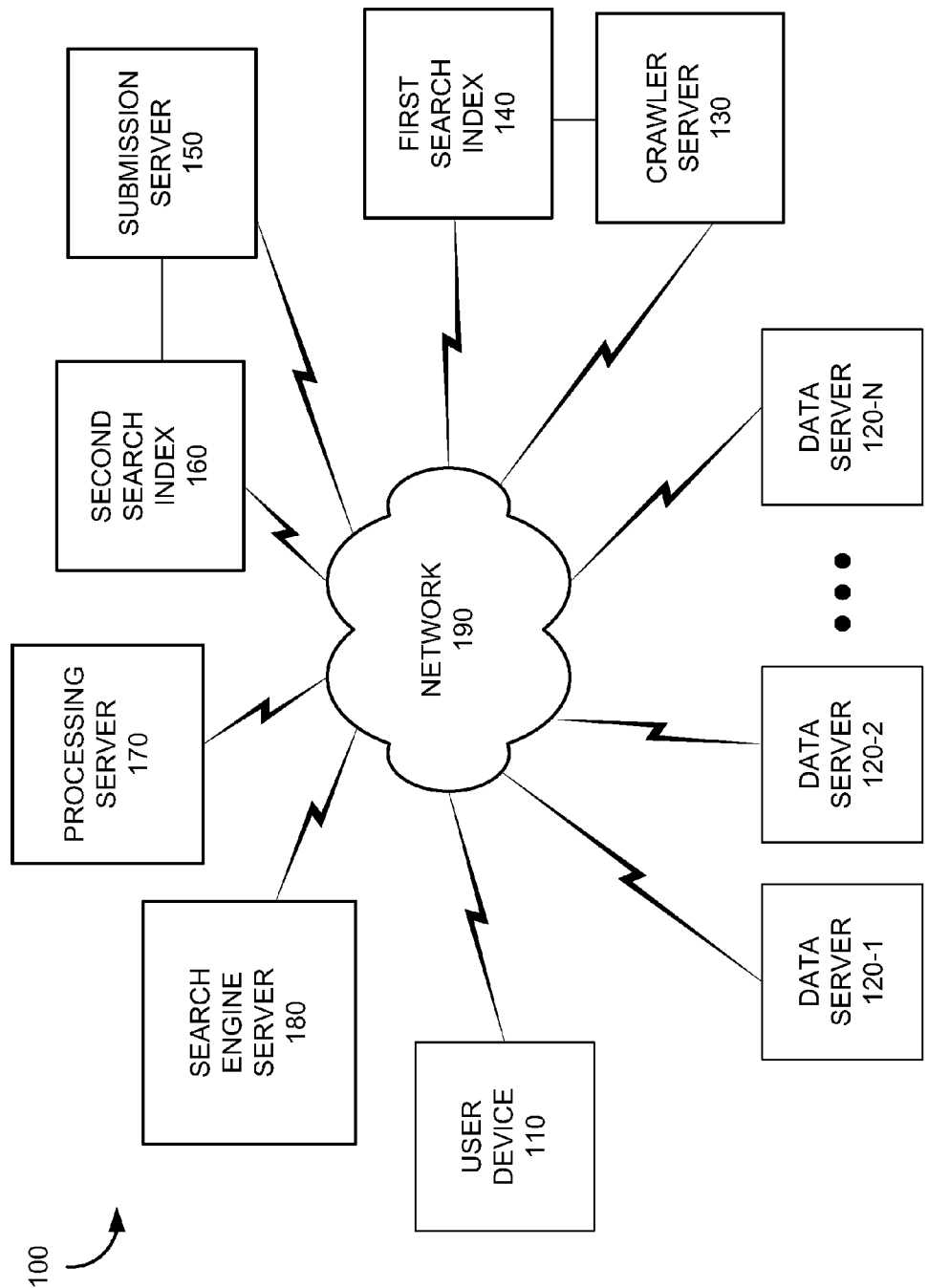
FIG. 1 is a diagram of an example environment in which systems and/or methods described herein may be implemented.

The following detailed description refers to the accompanying drawings. The same reference numbers in different drawings may identify the same or similar elements.

A document may refer to any machine-readable and machine-storable work product. A document may include, for example, an e-mail, a website, a business listing, a file, a combination of files, one or more files with embedded links to other files, a news group posting, a blog, an advertisement, an image, a video, a digital map, etc. In the context of the Internet, a document may refer to a web page. Documents may include textual information, embedded information (such as meta information, images, hyperlinks, etc.), and/or embedded instructions (such as Javascript, etc.).

Content may refer to data that may or may not be in document form. Examples of content may include data associated with one or more documents, data in one or more databases, etc.

An address may refer to an identifier that specifies a network location of a document. An address may include a Uniform Resource Identifier (URI), a Uniform Resource Locator (URL), etc. The address may include a scheme name (e.g., http), a domain (e.g., example.com), and/or one or more parameters. The parameters may include a path to a document/resource (e.g., a web page used to purchase a particular product), Common Gateway Interface (CGI) scripts, query strings, fragment identifiers, file names, and/or any other portions of the address that are not part of the scheme name or the domain.

An implementation described herein may provide a mapping of a first address of a first index to a corresponding second address of a second index. A mapping of a first address to a second address may indicate that the first address and the second address identify the same document. The mapping may allow a search engine provider to determine when different users are accessing the same document by using different addresses. The mapping may also allow the first index and the second index to exchange information that is stored in association with the same document by each one of the indexes. The exchanged information may include, for example, meta information, a last crawled date, data submitted by a user, etc. that is originally stored in association with the document in the first index. As a result, for example, the second index may provide a portion of information, received from the first index, when the second index provides a result associated with the document.

In the description below, the first index is described in terms of a web search index that is populated based on activity of a web crawler. The second index is described in terms of a search index that is populated based on addresses submitted by users (e.g., online merchants). In other implementations, both the first index and the second index may be populated based on activities of different crawlers or based on different submissions by different users. In yet other implementations, addresses of three or more indexes may be mapped together. For example, a first address of a first index, populated by a web crawler, may be mapped to a second address of a second index populated by a crawler and to a third address of a third index populated by a different crawler and/or based on submissions by users.

FIG. 1 is a diagram of an example environment 100 in which systems and/or methods described herein may be implemented. Environment 100 includes a user device 110, data servers 120-1, 120-2, . . . , 120-N (collectively referred to as "data servers 120" and individually as "data server 120"), a crawler server 130, a first search index 140, a submission server 150, a second search index 160, a processing server 170, a search engine server 180, and a network 190. In practice, environment 100 may include additional components, fewer components, different components, or differently arranged components than are shown in FIG. 1. In some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with search engine server 180 via network 190. In one implementation, user device 110 may take the form of a web service terminal, a personal computer, a laptop, a handheld computer, a smart phone, a mobile telephone device, a personal digital assistant (PDA), a personal media player, a set-top box (STB) connected to a video display device (e.g., a television), or any other type of computation or communication device capable of transmitting data to search engine server 180. In another implementation, user device 110 may represent multiple devices operated by a user, including, for example, a personal computer and a mobile device.

Data server 120 may include any computation or communication device, such as a communication device that is capable of communicating with user device 110 and/or crawler server 130. Data server 120 may store or maintain documents that may be browsed by a user of user device 110, or may be crawled by crawler server 130. Such documents may include data related to items (e.g., products), published news stories, images, user groups, geographic areas, or any other type of data. For example, data server 120 may store or maintain data related to specific products, such as product data provided by one or more online merchants and/or product manufacturers. As another example, data server 120 may store or maintain news stories from any type of news source, such as, for example, a newspaper, a magazine, or a news blog. As yet another example, data server 120 may store or maintain data related to other types of documents, such as pages of personal web sites.

Crawler server 130 may include any computation or communication device, such as a communication device that is capable of communicating with data servers 120 and/or first search index 140. Crawler server 130 may include one or more components that access, fetch, index, search, and/or maintain documents. Crawler server 130 may implement a data aggregation service by crawling a corpus of documents (e.g., web pages) hosted on data servers 120. For example, crawler server 130 may send a request to data server 120 for a document or information about the document and then provide the document or the information about the document to an indexer (not shown in FIG. 1).

The indexer may index the documents to create first search index 140. In one implementation, the indexer may extract text from the content of the crawled document, extract individual terms or other data from the text, and sort those terms or other data (e.g., alphabetically) into first search index 140. In other implementation, the indexer may index the documents by using other standard indexing techniques. Each entry in first search index 140 may contain a term or other data stored in association with a list of documents in which the term or other data appears and the location within the document where the term or other data appears. In another implementation, each entry in first search index 140 may contain a representation of a document, a list of terms that appear within the document, and/or other information (e.g., metadata) associated with the document. Search engine sever 180 may subsequently use first search index 140 to search for specific documents whose content is responsive to a search query.

Submission server 150 may include any computation or communication device, such as a communication device that is capable of communicating with data servers 120 and/or second search index 160. Submission server 150 may populate second search index 160 with addresses and information associated with the addresses. Operators of data servers 120 and/or one or more other types of users (e.g., online marketers) may provide the addresses and the information associated with the addresses to submission server 150.

Submission server 150 may receive, from an operator of data server 120 (e.g., an online merchant) and/or from a different user (e.g., an online marketer), information about an item (e.g., a product, a news article, etc.) and an address that a user of user device 110 may use to access a document (e.g., a web page stored by data server 120) associated with the item. In the product context, for example, the information about the item may include, for example, an identifier of a product, a brand of the product, a type of the product, a price of the product, terms associated with the product, etc. The user may access the document, by using the address, to purchase the product from the operator of data server 120.

An address, submitted to submission server 150, may include one or more CGI parameters and/or one or more other types of parameters that allow an operator of data server 120 and/or other parties (e.g., who provide the address to submission server 150) to collect information about user device 110 and/or one or more other user devices that use the address to access the document. For example, the address may include a special script that provides information about which web page/site (e.g., a particular search engine) was used to access the document identified by the address.

Submission server 150 (or an indexer associated with submission server 150 and second search index 160) may index submitted addresses and information associated with the addresses to create second search index 160. Submission server 150 may create an entry for an address in second search index 160, based on the address and information associated with the address. In the product context, for example, second search index 160 may include entries that store information about products and corresponding addresses that a user may use to access documents associated with the products.

In another implementation, submission server 150 may send a request to data server 120 for a document associated with an address and download the entire document. Submission server 150 may provide the address, the information associated with the address, and/or the document to an indexer. The indexer may index the document in second search index 160 by using one or more techniques described above with reference to first search index 140, including, for example, standard indexing techniques.

Processing server 170 may include any computation or communication device, such as a communication device that is capable of communicating with first search index 140 and/or second search index 160. Processing server 170 may retrieve addresses that are indexed in first search index 140, addresses that are indexed in second search index 160, and/or addresses that are indexed in one or more other indexes (not shown in FIG. 1). Processing server 170 may map addresses of first search index 140 to corresponding addresses of second search index 160 which identify the same documents as the addresses of first search index 140. Processing server 170 may transmit the mappings of the addresses to first search index 140 and/or second search index 160. In another implementation, processing server 170 may retrieve addresses from three or more different indexes and map corresponding addresses of the different indexes to one another. Processing server 170 may transmit relevant mappings to all the different indexes.

Search engine server 180 may include any computation or communication device, such as a communication device that is capable of communicating with first search index 140 and/or second search index 160. Search engine server 180 may include one or more search engine servers that user device 110 may access to utilize a first search engine (e.g., a web search engine) that uses first search index 140 and/or a second search engine (e.g., a products search engine, a news search engine, etc.) that uses second search index 160.

For example, a first search engine, of search engine server 180 may receive a search query from user device 110. Search engine server 180 may search first search index 140, based on the received search query, to match terms of the search query with terms associated with entries in first search index 140. Search engine server 180 may retrieve a list of results, from first search index 140, that are responsive to the search query.

In another example, a second search engine, of search engine server 180, may receive a search query from user device 110. Search engine server 180 may search second search index 160, based on the received search query, to match terms of the search query with terms associated with entries in second search index 160. Search engine server 180 may retrieve a corresponding list of results, from second search index 160, that is responsive to the search query. In the product context, for example, second search index 160 may store information about products and corresponding addresses that a user may use to access documents associated with the products. The user may use the second search engine that allows the user to search through the products. The second search engine may use second search index 160 to retrieve relevant results about one or more of the products.

Search engine server 180 may provide the results to user device 110. User device 110 may display the results in, for example, a browser window. Each one of the results may include an address associated with a document, a snippet of content extracted from the document, and/or other information associated with the document and/or the address.

Network 190 may include a single network, multiple networks of a same type, or multiple networks of different types. For example, network 190 may include one or more of: a direct connection between devices/components, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, or any combination of the aforementioned networks. Furthermore, any direct connection, shown in FIG. 1 between components of environment 100, may include/represent connections via network 190.

Figure 2:
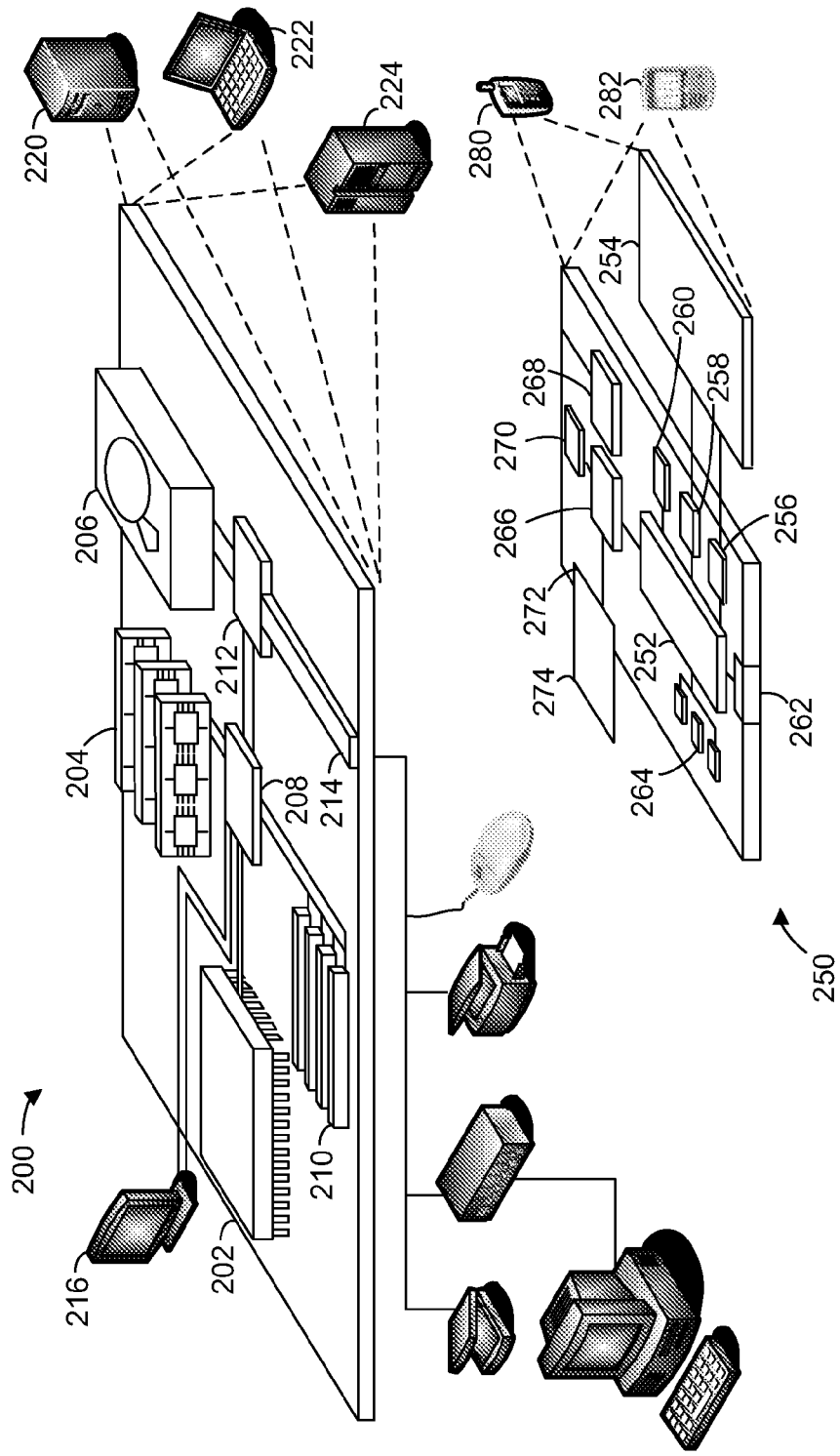
FIG. 2 illustrates an example of a computing device and a mobile computing device.

FIG. 2 is a diagram that shows an example of a computing device 200 and a mobile computing device 250, which may be used with the techniques described herein. Computing device 200 may correspond to, for example, user device 110, data server 120, crawler server 130, first search index 140, submission server 150, second search index 160, processing server 170, and/or search engine server 180. Mobile computing device 250 may correspond to, for example, user device 110.

Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In another implementation, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system, etc.).

Memory 204 may store information within computing device 200. In one implementation, memory 204 may include a volatile memory unit or units. In another implementation, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In one implementation, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In one implementation, high-speed controller 208 may be coupled to memory 204, display 216 (e.g., through a graphics processor or accelerator), and to high-speed expansion ports 210, which may accept various expansion cards (not shown). In the implementation, low-speed controller 212 may be coupled to storage device 206 and to low-speed expansion port 214. Low-speed expansion port 214, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device (not shown), such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a micro-drive or other device (not shown), to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a TFT LCD (Thin-Film-Transistor Liquid Crystal Display), an OLED (Organic Light Emitting Diode) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a SIMM (Single In Line Memory Module) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided via SIMM cards, along with additional information, such as placing identifying information on a SIMM card in a non-hackable manner.

Memory 264 and/or expansion memory 274 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, a personal digital assistant (not shown), and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
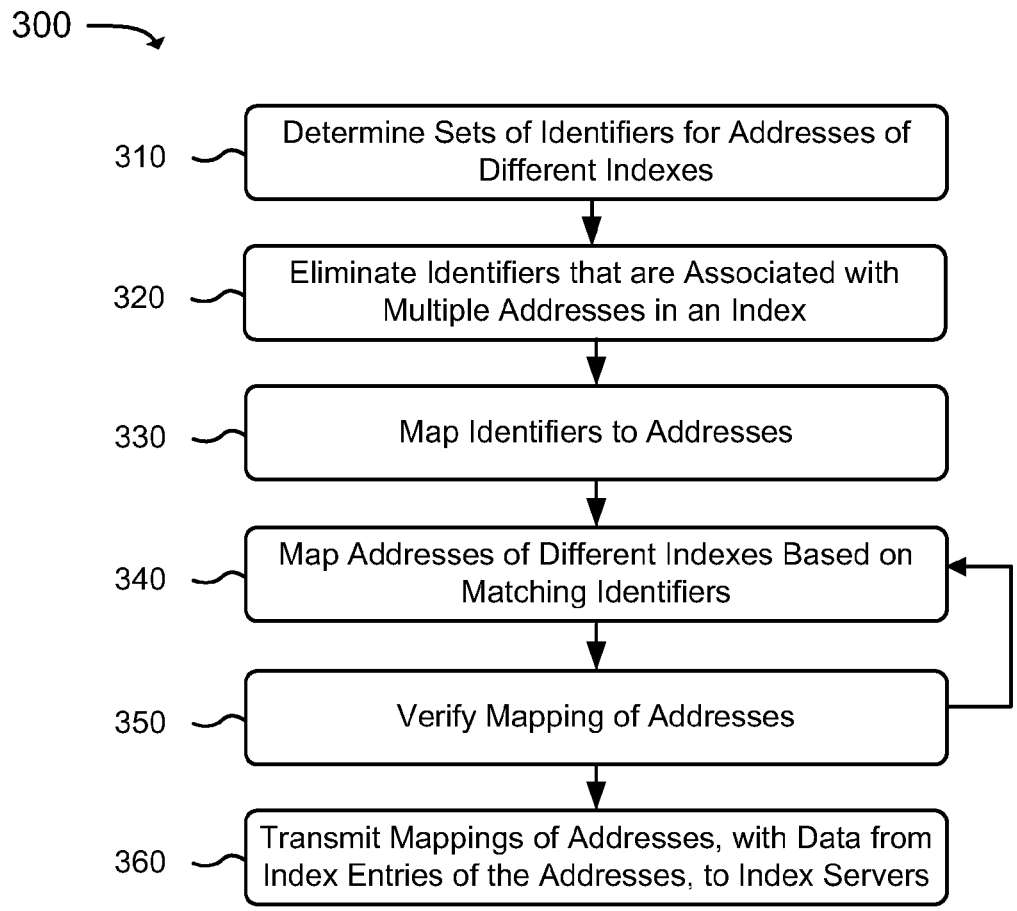
FIG. 3 is a flowchart illustrating an example process for mapping addresses of different indexes.

FIG. 3 is a flowchart illustrating an example process 300 for mapping addresses of different indexes. In one implementation, processing server 170 may perform process 300. In other implementations, one or more other devices, separate from, or in combination with, processing server 170, may perform some or all of process 300. A portion of process 300 is described below with reference to FIGS. 4A-4E.

As shown in FIG. 3, process 300 may include determining sets of identifiers for addresses of different indexes (block 310). For example, processing server 170 may retrieve addresses from first search index 140 and addresses from second search index 160. Processing server 170 may determine sets of identifiers for the addresses of first search index 140 and for the addresses of second search index 160. Each set of identifiers may include one or more identifiers. To determine an identifier, processing server 170 may determine a domain contained within the address and/or identify one or more parameters contained within the address. The address may include a parameter located between a first symbol and a second symbol or next to only one of the symbols. A symbol may include, for example, one of a slash, a question mark, an equal sign, a pound sign, and/or any other type of symbol that may be used before a parameter. The identifier may include one or more parameters. Processing server 170 may identify the parameters to include in the identifier based on the domain, a form of the address, and/or a rule associated with the domain, as described further below in reference to FIG. 5. Processing server 170 may determine the form of the address based on the domain.

Figure 4B:
Figure 4B:
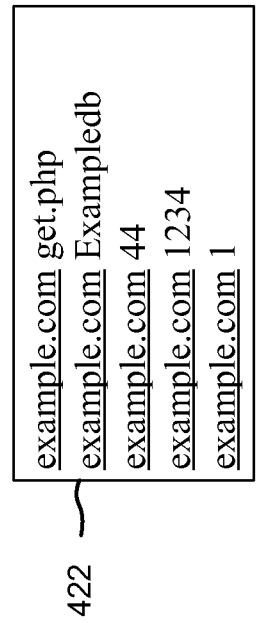

For example, FIG. 4A illustrates an example address 410 that may be retrieved from first search index 140 and an example address 420 that may be retrieved from second search index 160. Address 410 includes a domain ("example.com"), a first parameter ("product"), and a second parameter ("1234"). Address 420 includes a domain ("example.com"), a first parameter ("get.php"), a second parameter ("Exampledb"), a third parameter ("44"), a fourth parameter ("1234"), and a fifth parameter ("1"). Processing server 170 may determine a set of identifiers 412 (FIG. 4B) for address 410 based on the identified parameters. As shown in FIG. 4B, set of identifiers 412 may includes a first identifier ("product") and a second identifier ("1234"). Processing server 170 may also determine a set of identifiers 422 (FIG. 4B) for address 420. As shown in FIG. 4B, set of identifiers 422 includes a first identifier ("get.php"), a second identifier ("Exampledb"), a third identifier ("44"), a fourth identifier ("1234"), and a fifth identifier ("1").

Process 300 may further include eliminating identifiers that are associated with multiple addresses in an index (block 320). For example, after determining the sets of identifiers for the addresses of first search index 140, processing server 170 may eliminate identifiers that are common to sets of identifiers associated with multiple addresses in first search index 140. In other words, processing server 170 may determine that an identifier is in a first set of identifiers for a first address of first search index 140. Processing server 170 may eliminate the identifier from the first set of identifiers if processing server 170 determines that the identifier is also in a second set of identifiers for a second address of first search index 140. When processing server 170 determines that the identifier is in the first set of identifiers and the second set of identifiers, processing server 170 may eliminate the identifier from the first set of identifiers, from the second set of identifiers (i.e., common to a set of identifiers associated with the first address and a set of identifiers associated with the second address), and from any other set of identifiers associated with address in first search index 140. Similarly, processing server 170 may eliminate identifiers from the sets of identifiers that are associated with multiple addresses of second search index 160.

Figure 4C:
Figure 4C:

To illustrate the forgoing, assume that processing server 170 retrieves a different address (e.g., http://www.example.com/product/1211) from first search index 140. Processing server 170 may determine a different set of identifiers for this different address. Processing server 170 may determine that set of identifiers 412 (FIG. 4B) and the different set of identifiers, which are both associated with addresses in first search index 140, include "product" as an identifier. Accordingly, processing server 170 may eliminate the product identifier from set of identifiers 412 and the different set of identifiers. FIG. 4C illustrates set of identifiers 412 after the product identifier is eliminated from set of identifiers 412.

Assume that processing server 170 also retrieves a different address (e.g., http://products.example.com/get.php?source=Exampledb&UserId=44&sku=4568&ref=1) from second search index 160. Processing server 170 may determine a different set of identifiers for this different address. Processing server 170 may determine that set of identifiers 422 (FIG. 4B) and the different set of identifiers, which are both associated with addresses in second search index 160, include "get.php," "Exampledb," "44," and "1" as identifiers. Accordingly, processing server 170 may eliminate the identifiers ("get.php," "Exampledb," "44," and "1") from set of identifiers 422 and the different set of identifiers. FIG. 4C illustrates set of identifiers 422 after the identifiers ("get.php," "Exampledb," "44," and "1") are eliminated from set of identifiers 422.

In another implementation, processing server 170 may eliminate an identifier when the identifier is associated with addresses in more than a particular quantity (e.g., three or more) of addresses in an index (e.g., first search index 140 or second search index 160). The particular quantity may vary, for example, based on a type of the index, domain(s) of the addresses associated with the identifier, and/or other information associated with the index.

Figure 4D:
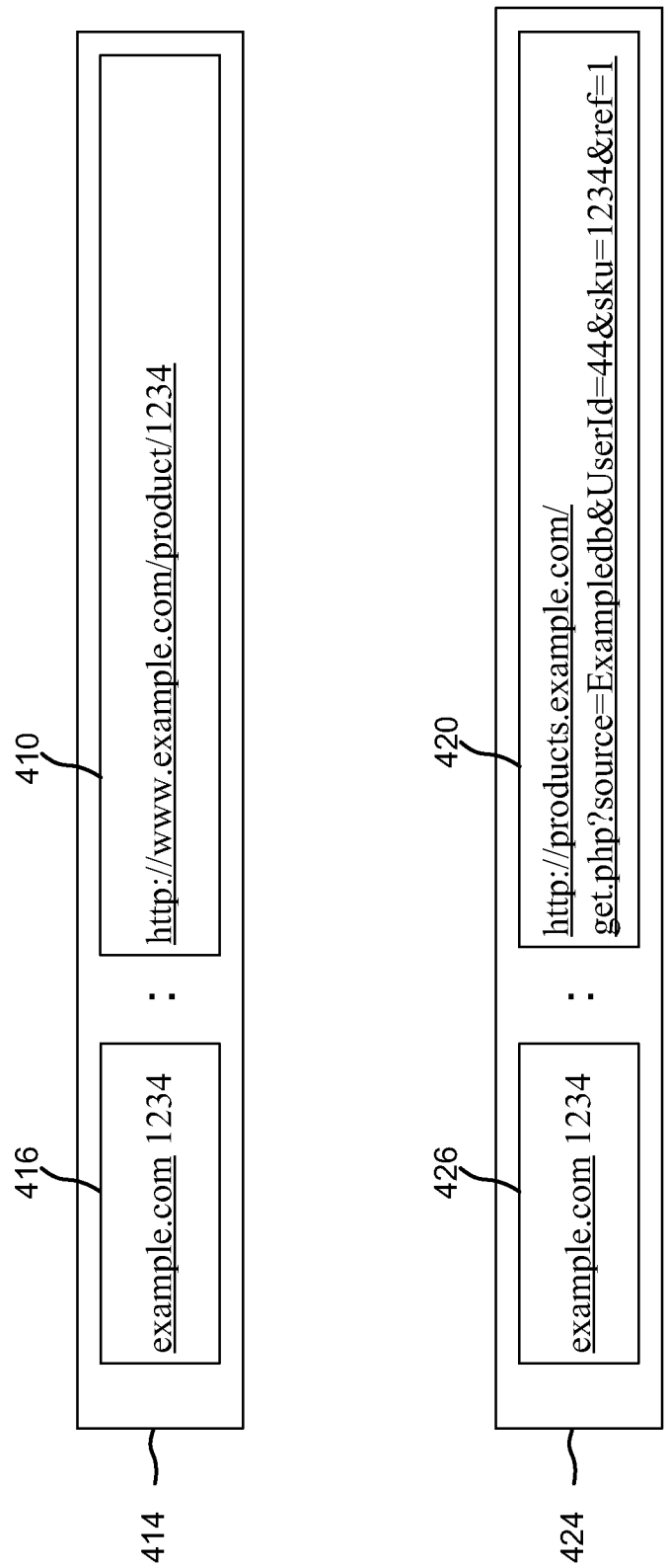
Figure 4E:
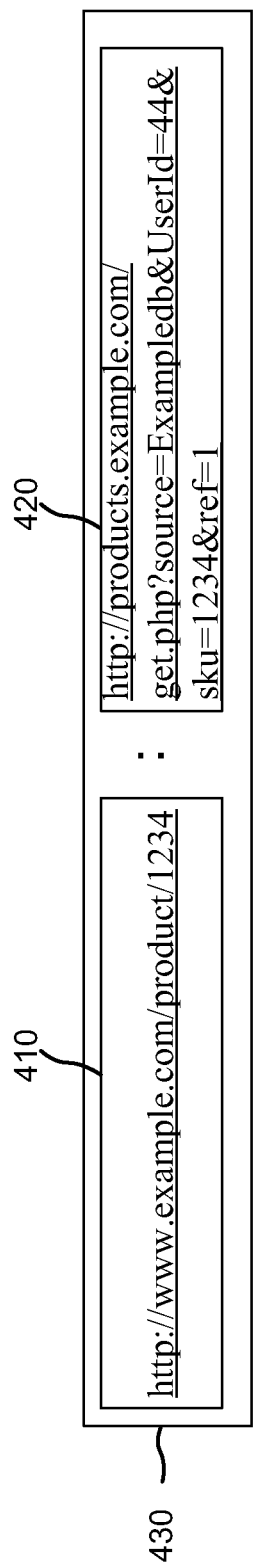

As further shown in FIG. 3, process 300 may include mapping identifiers to the addresses (block 330). For example, processing server 170 may produce mappings between the identifiers of the sets of identifiers and the addresses associated with the sets of identifiers. For example, processing server 170 may produce a mapping 414 by mapping an identifier 416, of set of identifiers 412, to address 410, which is associated with set of identifiers 412, as shown in FIG. 4D. Processing server 170 may produce a mapping 424 by mapping an identifier 426, of set of identifiers 422, to address 420, which is associated with set of identifiers 422, as shown in FIG. 4D.

Process 300 may also include mapping the addresses of the different indexes based on matching identifiers (block 340). For example, while mapping the identifiers to the addresses, processing server 170 may associate identifier 416 and identifier 426 with the same key (e.g., 1234 or example.com 1234) since identifier 416 is equivalent to identifier 426. Processing server 170 may produce a mapping 430 (FIG. 4E) that maps address 410 to address 420 because address 410 and address 420 share a common domain (e.g., example.com) and are both mapped to identifiers that are associated with the same key (e.g., 1234).

Process 300 may also include verifying the mapping of the addresses (block 350). For example, processing server 170 may retrieve, from first search index 140, first information about a document associated with address 410. The first information may include content of the document, metadata (e.g., a language used for the document, a length of the document, a quantity of links to/from the document, etc.), and/or any other information associated with the document (e.g., a title associated with the document). Processing server 170 may retrieve, from second search index 160, second information about a document associated with address 420. The second information may include content of the document, metadata (e.g., a language used for the document, a length of the document, a quantity of links to/from the document, etc.), and/or any other information associated with the document (e.g., a title associated with the document).

In another implementation, processing server 170 may use address 410 to retrieve the first information from data server 120. Processing server 170 may use address 420 to retrieve the second information from data server 120.

Processing server 170 may determine whether one or more portions of the first information match one or more corresponding portions of the second information. Processing server 170 may verify that mapping 430 is correct when the one or more portions of the first information match the one or more corresponding portions of the second information. For example, processing server 170 may verify that mapping 430 is correct when a title, included in the first information, matches a title, included in the second information; when a length of a document, included in the first information, matches a length of a document, included in the second information; etc.

Process 300 may also include transmitting mappings of addresses, with data from index entries of the addresses, to servers associated with the indexes (block 360). For example, processing server 170 may retrieve first data of an entry, of first search index 140, that is associated with address 410. The first data may include, for example, a snippet of the document identified by address 410 and/or any other information associated with the document. Processing server 170 may retrieve, second data of an entry, of second search index 160, that is associated with address 420. The second data may include, for example, information provided by an operator of data server 120, along with address 420, to submission server 150 and/or any other information associated with the document. In the product context, for example, the information provided by the operator may include an identifier of a product, a brand of the product, a type of a product, a price of a product, etc.

Processing server 170 may transmit, to first search index 140, information about mapping 430 and the second data or a portion of the second data. Processing server 170 may transmit, to second search index 160, the information about mapping 430 and the first data or a portion of the first data. When search engine server 180 later retrieves, from first search index 140, a search result that is associated with address 410, the search result may include one or more components of the second data (e.g., price of the product) that were not originally included in first search index 140, as described further below in reference to FIGS. 6A and 6B. Similarly, when search engine server 180 later retrieves, from second search index 160, a search result that is associated with address 420, the search result may include one or more components of the first data that were not originally included in second search index 160.

Figure 5:
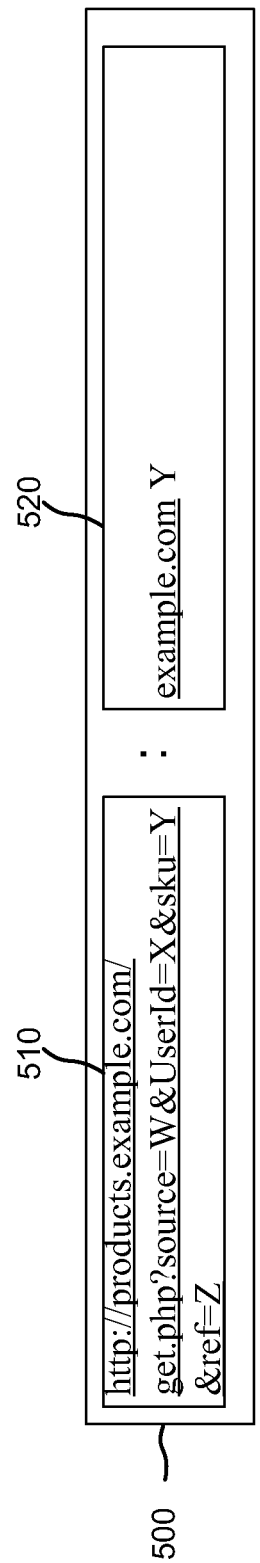
FIG. 5 illustrates an example representation of a rule stored for a particular domain.

FIG. 5 illustrates an example representation of a rule 500 stored for a particular domain. Processing server 170 may determine rule 500 after retrieving and processing one or more addresses with the same domain and/or form of address. For example, processing server 170 may receive and process a first address,
    http://products.example.com/
get.php?source=Exampledb&UserId=44&sku=4568&ref=1, and a second address,
    http://products.example.com/
get.php?source=Exampledb&UserId=44&sku=1234&ref=1.

Assume that processing server 170 identifiers the following identifiers for the first address: Exampledb, 44, 4568, and 1. Assume that processing server 170 identifiers the following identifiers for the second address: Exampledb, 44, 1234, and 1. Assume that processing server 170 maps the first address to a third address, of a different index, based on identifier 4568, and maps the second address to a fourth address, of the different index, based on identifier 1234.

Accordingly, processing server 170 may determine that when an address includes a particular domain (e.g., example.com) and has a form 510 (where W, X, Y, and Z represent different parameters), only a particular portion (e.g., parameter Y) of the address is relevant to match the address to an address of the different index. Based on this determination, processing server 170 may produce rule 500. Rule 500 may specify that when an address includes domain example.com and is in form 510, a set of identifiers associated with the address only includes an identifier 520, which includes parameter Y.

Assume, thereafter, that processing server 170 receives another address (e.g., http://products.example.com/get.php?source=Exampledb&UserId=44&sku=1211&ref=1). Processing server 170 does not have to determine a set of identifiers for the address and then eliminate identifiers from the set of identifiers, as described above with reference to FIG. 3. Instead, processing server 170 may determine a domain of the address (e.g., example.com). Processing server 170 may store or have access to different forms that are associated with the domain and rules associated with each one of the different forms. Processing server 170 may determine form 510, which is one of the different forms, of the address based on the domain. Processing server 170 may determine a particular identifier (e.g., example.com 1211) based on rule 500, which is associated with form 510. The set of identifiers associated with the address may include the particular identifier determined based on the rule.

FIG. 6A illustrate an example result 610 provided in response to a search query before a mapping of a web search index to a product search index. Assume that a user enters a search query "Example Company Telephone" into a web search engine that uses the web search index. In response, the web search engine may return results, including result 610.

FIG. 6B illustrate an example result 620 provided in response to the search query after the mapping of the web search index to the product search index. Assume that processing server 170 maps a first URL (e.g., http://www.example.com/product/1211) of the web search index to a second URL (e.g., http://products.example.com/get.php?source=Exampledb&UserId=44&sku=1234&ref=1) of the product search index. The product search index may store price data 625 (e.g., $24) in association with the second URL. After the mapping, the web search index may receive price data 625 from the product search index, and may store price data 625 in association with the first URL. Assume that the user enters, again after the mapping, the search query "Example Company Telephone" into the web search engine. In response, the web search engine may return results, including result 620 for the first URL. Result 620 may include price data 625, which is now stored in association with the first URL.

Implementations described herein may provide mappings between addresses of different indexes. Each mapping may indicate that addresses associated with the mapping identify the location of the same document.

The foregoing description provides illustration and description, but is not intended to be exhaustive or to limit the embodiments to the precise form disclosed. Modifications and variations are possible in light of the above teachings or may be acquired from practice of these embodiments.

For example, while a series of blocks has been described with regard to FIG. 3, the order of the blocks may be modified in other implementations. Further, non-dependent blocks may be performed in parallel. In addition, other blocks may be provided, or blocks may be eliminated, from the described flowchart, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:

identifying, by at least one of the one or more server devices, a first address stored in a first search index,
the first address being associated with a particular document;

determining, by at least one of the one or more server devices, one or more first identifiers associated with the first address;

identifying, by at least one of the one or more server devices, a second address stored in a second search index,
the second address being associated with the particular document, and
the second search index being different from the first search index;

determining, by at least one of the one or more server devices, one or more second identifiers associated with the second address;

producing, by at least one of the one or more server devices, a mapping of the first address to the second address based on a first identifier, of the one or more first identifiers, and a second identifier, of the one or more second identifiers, the first identifier being equal to the second identifier;

verifying, by at least one of the one or more server devices, that the mapping of the first address to the second address is correct based on first information that is stored regarding the particular document in the first search index and second information that is stored regarding the particular document in the second search index; and transmitting, by at least one of the one or more server devices, the mapping, of the first address to the second address, to a first index server that stores the first search index or to a second index server that stores the second search index.

2. The method of claim 1, further comprising:
generating the first search index by crawling a first plurality of documents; and
generating the second search index by receiving information regarding a second plurality of documents from one or more users and without crawling the second plurality of documents.

3. The method of claim 1, further comprising:
eliminating an identifier from the one or more first identifiers when the identifier is also associated with a third address stored in the first search index,
where the first identifier is associated with only the first address.

4. The method of claim 1, where producing the mapping of the first address to the second address comprises:
associating the first identifier with a key,
associating the second identifier with the key, and
producing the mapping of the first address to the second address based on the key.

5. The method of claim 1, where determining the one or more first identifiers associated with the first address comprises:
identifying a parameter between a first symbol, of the first address, and a second symbol, of the first address, and
using the parameter as the first identifier.

6. The method of claim 1,
where the first identifier is a combination of two or more parameters of the first address, and
where the second identifier is a combination of two or more parameters of the second address, and
where a quantity of the two or more parameters of the first address is equal to a quantity of the two or more parameters of the second address.

7. The method of claim 1,
where verifying that the mapping is correct comprises:
verifying that the mapping is correct based on one or more portions of the first information matching one or more corresponding portions of the second information, and
where the one or more portions comprise at least one of:
a title associated with the particular document,
a language used for the particular document, or
content of the particular document.

8. The method of claim 1, where transmitting the mapping comprises:
retrieving, from the second search index, data from an entry for the second address, and
transmitting, to the first search index, the data with the mapping.

9. The method of claim 1, further comprising:
determining one or more third identifiers for a third address that identifies the particular document,
the third address being stored in a third search index that is different from the first search index and the second search index,
producing the mapping of the first address to the second address comprising:
mapping the third address to the first address and the second address based on the third identifier, and
the third identifier being equal to the first identifier and the second identifier.

10. A non-transitory computer-readable medium storing instructions, the instructions comprising:
one or more instructions that, when executed by at least one processor, cause the at least one processor to:
determine a domain and an identifier included in a first address stored in a first search index;
determine a key associated with the identifier;
produce, based on the domain and the key, a mapping of the first address to a second address that is associated with the domain and the key,
the second address being stored in a second search index that is different from the first search index;
determine that first content associated with the first address matches second content associated with the second address;
verify that the mapping is correct based on the first content matching the second content; and
transmit the mapping of the first address to the second address to at least one of a first index server that stores the first search index or to a second index server that stores the second search index.

11. The non-transitory computer-readable medium of claim 10, where the one or more instructions to determine the domain and the identifier comprise:
one or more instructions that, when executed by the at least one processor, cause the at least one processor to:
determine the domain of the first address,
determine a form of the first address based on the domain, and
determine the identifier based on a rule associated with the form.

12. The non-transitory computer-readable medium of claim 10, where the one or more instructions to determine the domain and the identifier comprise:
one or more instructions that, when executed by the at least one processor, cause the at least one processor to:
determine parameters of the first address, and
determine a set of identifiers, for the first address, based on the parameters,
the set of identifiers including the identifier.

13. The non-transitory computer-readable medium of claim 12, where the identifier comprises one or more of the parameters.

14. The non-transitory computer-readable medium of claim 12, where the instructions further comprise:
one or more instructions that, when executed by the at least one processor, cause the at least one processor to:
eliminate a third identifier from the set of identifiers when the third identifier is associated with more than a particular quantity of addresses stored in the first search index.

15. The non-transitory computer-readable medium of claim 10, where the instructions further comprise:

one or more instructions that, when executed by the at least one processor, cause the at least one processor to:
determine parameters of the second address,
determine a set of identifiers, for the second address, based on the parameters,
eliminate one or more identifiers from the set of identifiers, and
associate the second address with the key based on a particular identifier that remains in the set of identifiers after the eliminating,
the identifier being the particular identifier.

16. A system comprising:
a processor to:
determine a first identifier for a first address stored by a first index server,
determine a second identifier for a second address stored by a second index server,
the first index server being different from the second index server,
produce a mapping of the first address to the second address when the first identifier matches the second identifier,
retrieve first data of an entry, of the first index server, for the first address,
verify that the mapping of the first address to the second address is correct based on first information that is stored, in association with the first address, by the first index server and second information that is stored, in association with the second address, by the second index server, and
transmit, to the second index server, the mapping of the first address to the second address and the first data.

17. The system of claim 16, where the processor is further to:
retrieve second data of an entry, of the second index server, for the second address, and
transmit, to the first index server, the mapping of the first address to the second address and the second data.

18. The system of claim 16, where the first information includes information identifying one or more of:
a language used for a particular document,
a length of the particular document,
a quantity of links to or from the particular document, or
a title associated with the particular document.

19. The system of claim 16,
where the first index server stores a first search index that is created via crawling,
where the first search index includes the entry, and
where the second index server stores a second search index that is created based on information provided by one or more users regarding a plurality of documents.

20. The non-transitory computer-readable medium of claim 10, where the one or more instructions to verify that the mapping is correct comprise:
one or more instructions that, when executed by the at least one processor, cause the at least one processor to:
determine that first metadata associated with the first address matches second metadata associated with the second address, and
verify that the mapping is correct based on the first content matching the second content and based on the first metadata matching the second metadata.

* * * * *